March 8, 1938. J. A. JOHNSON 2,110,670

DRY SMOKE PIPE

Filed Oct. 29, 1936

INVENTOR
Jesse A. Johnson
BY
ATTORNEY

Patented Mar. 8, 1938

2,110,670

UNITED STATES PATENT OFFICE 2,110,670

DRY SMOKE PIPE

Jesse A. Johnson, New York, N. Y.

Application October 29, 1936, Serial No. 108,152

4 Claims. (Cl. 131—12)

This invention relates to new and useful improvements in smoking pipes and has more particular reference to a pipe adapted to give a dry smoke.

More specifically, the invention contemplates characterizing the dry smoke pipe by the fact that it has a stem consisting of an inner section continuing into a right angle intermediate section, which in turn continues into an outer section parallel to but displaced from the inner section.

Still further the invention contemplates the provision of an opening in the intermediate section arranged to permit the cleaning of the outer section.

Another one of the objects of this invention consists in the provision of a disc element or similar element adapted to close the opening mentioned in the previous paragraph and capable of being moved to a position in which the opening is unobstructed.

Still further the invention proposes the provision of a valve arranged in association with the disc element mentioned in the previous paragraph and adapted to automatically close, as the disc element is opened, for the purposes hereinafter described.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
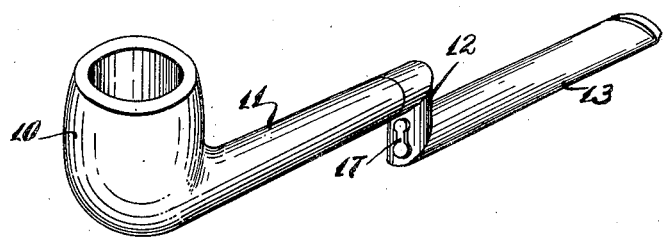
Fig. 1 is a perspective view of a pipe constructed according to this invention.
Figure 4:
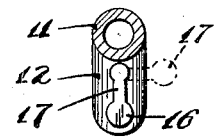
Fig. 4 is a sectional view taken on the line 4—4 of Fig. 2.
Figure 2:
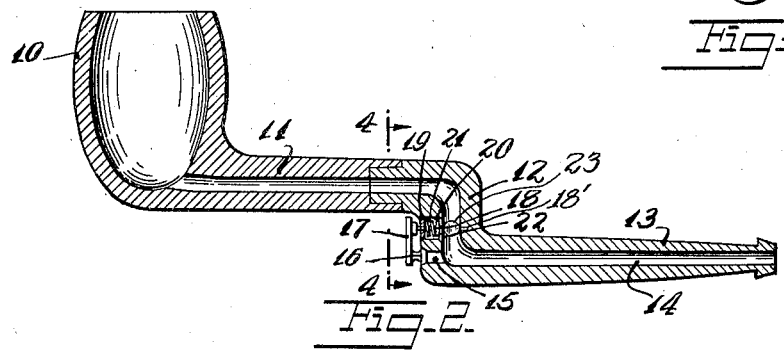
Fig. 2 is a longitudinal vertical view, partly in section, of the pipe shown in Fig. 1.

The dry smoke pipe, according to this invention, comprises a pipe bowl 10 which is provided with a stem portion comprising an inner section 11 continuing into an intermediate section 12, which in turn continues into an outer section 13 parallel to but offset from the inner section 11. Preferably, the intermediate section 12 is arranged at right angles between the sections 11 and 13.

The outer end of the section 13 comprises the mouthpiece for the pipe. A bore 14 extends through the sections and provides a passage for the smoke. An opening 15 is formed in the intermediate section 12, in line with that section of the bore 14 which is formed in the outer section 13. This opening 15 is normally closed with a disc element 16.

Figure 3:
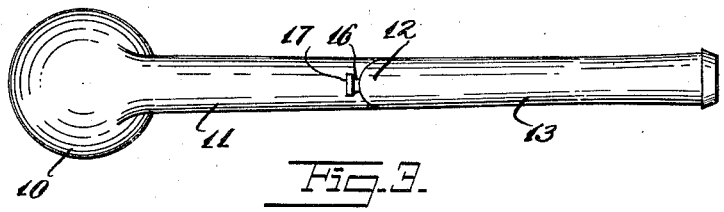
Fig. 3 is a bottom plan view of the pipe shown in Fig. 1.
Figure 5:
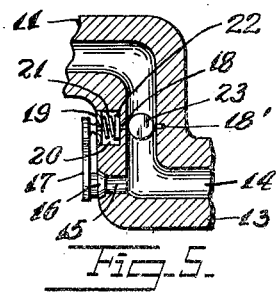
Fig. 5 is a fragmentary enlarged view of a portion of Fig. 2.

The disc element 16 is mounted upon an arm 17 which is pivotally mounted at its other end by a spindle 18. The spindle 18 passes through a support plate 19 to a hollow area 20 within the wall of the intermediate section. Within this hollow area there is a spring 21 which acts between the plate 19 and a head 22 formed upon the spindle 18. The spring 21 serves to force the disc element 16 against the end of the opening 15 and furthermore holds the arm 17 in the various rotated positions in which it may be placed. The arm is capable of being pivoted through 90° as indicated by the dot and dash lines in Fig. 3, in which position the opening 15 is unobstructed.

It is possible to pass a pipe cleaner through the stem portion of the pipe and through the opening 15 for thoroughly cleaning the pipe. The disc element 16 may be moved into the closed position, or may be pivoted open as desired when the pipe is cleaned.

A butterfly valve 23 is fixedly mounted upon an extended portion 18' of the stem 18. This butterfly valve normally is in the open position when the disc 16 closes the opening 15. But when the disc 16 is moved so that the arm 17 is at right angles to its original position the butterfly valve 23 will have been turned through 90° to close the passage through the pipe stem. It is then possible to blow through the stem portion so that the wind enters the mouthpiece end of the stem portion and discharges through the opening 15. This permits clearing out of foul air which may harbor within the passage 14.

When the disc element 16 is closed upon the opening 15 the butterfly valve 23 is turned into the open position. In the open position of the valve it is possible to pass a pipe cleaner past one side or the other side, thereof for cleaning the passage for the smoke.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a smoking pipe, a stem comprising an inner section continuing into an intermediate section, in turn continuing into an outer section, an opening in the intermediate section in line with the passage for the smoke through the outer section, and a member for closing said opening, comprising a disc element, mounted upon an arm pivotally mounted upon said intermediate section, a spindle pivotally supporting said arm, and a butterfly valve mounted upon the inner end of said spindle and being adapted to close the opening in the intermediate section when said valve is open.

2. In a smoking pipe, a stem comprising an inner section continuing into an intermediate section, in turn continuing into an outer section, an opening in the intermediate section in line with the passage for the smoke through the outer section, and a member for closing said opening, comprising a disc element, mounted upon an arm pivotally mounted upon said intermediate section, a spindle pivotally supporting said arm, and a butterfly valve mounted upon the inner end of said spindle and being adapted to close the opening in the intermediate section when said valve is open, said spindle engaging through a hollow within the intermediate section, and a spring coaxially mounted upon said spindle and acting between a stationary portion and a head element upon a portion of the spindle.

3. In a smoking pipe, a stem comprising an inner section continuing into an intermediate section, in turn continuing into an outer section, an opening in the intermediate section in line with the passage for the smoke through the outer section, and a member for closing said opening, comprising a disc element, mounted upon an arm pivotally mounted upon said intermediate section, said arm being fixed on a spindle engaging into a hollow within the intermediate section, and a spring coaxially mounted upon said spindle and acting between a stationary portion and a head element upon a portion of the spindle, and a butterfly valve mounted upon an extended portion of said spindle for closing the passage through said stem when said arm is moved through 90°.

4. In a smoking pipe, a stem comprising an inner section and an outer section parallel with each other but offset from each other, an intermediate section connecting said inner section and said outer section and at right angles thereto and having an opening in line with the passage for smoke in the outer section, a disc element for normally closing said opening, a butterfly valve mounted in the passage for smoke in the intermediate section, and means connecting said disc element and said butterfly valve so that when said disc element is moved to open said opening said butterfly valve moves correspondingly to close the passage in said intermediate section.

JESSE A. JOHNSON.